March 18, 1958   J. E. ZIMMERLE   2,827,607
A. C. REGULATOR BRIDGE CIRCUIT
Filed Dec. 15, 1953
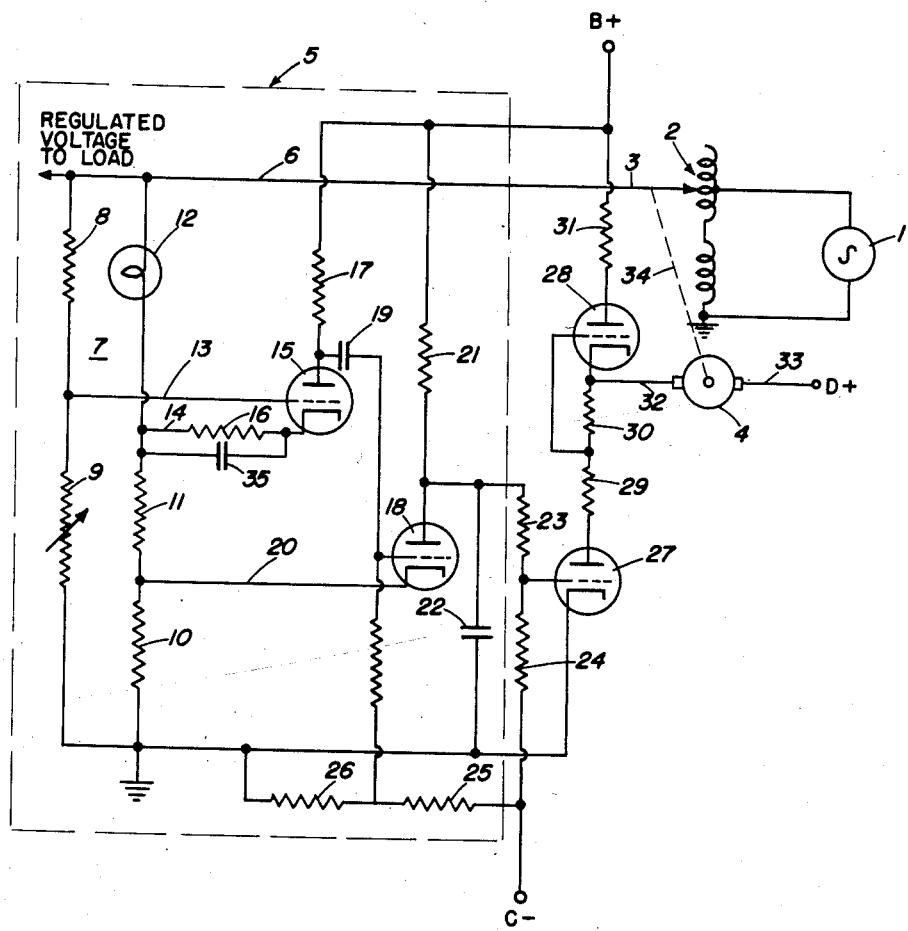
INVENTOR
JOSEPH E. ZIMMERLE
BY
ATTORNEYS

2,827,607
A. C. REGULATOR BRIDGE CIRCUIT

Joseph E. Zimmerle, Norwalk, Calif., assignor, by mesne assignments, to the United States of America as represented by the Secretary of the Navy Application December 15, 1953, Serial No. 398,445

5 Claims. (Cl. 323—66)

This invention relates to a circuit for use with a motor driven Variac or a saturable reactor in a root mean square type of alternating voltage regulator.

In the past, systems for regulating alternating voltage have relied on a transformer to supply voltage for a bridge circuit; or have used electron tube filaments in the bridge circuit; or have depended on suppressor grid injection of an alternating voltage for phase detection.

However, the instant invention utilizes a root mean square type of alternating voltage regulator circuit which is used in conjunction with a motor driven Variac or a saturable reactor, either of the latter being used to regulate an alternating voltage supply. The voltage regulator circuit consists of a resistance bridge containing an incandescent lamp in one of its legs, an amplifier tube connected to the bridge output, and a phase detector tube connected between the bridge and the amplifier tube. The output of this circuit is amplified and utilized to drive a saturable reactor or a direct current motor which is mechanically connected to the Variac. The Variac or saturable reactor is connected to an alternating voltage source. When the direct current motor is driven because of a variance in the line voltage from that which is desired it varies the voltage output across the Variac to provide the necessary regulation of the line voltage.

Accordingly, it is one object of the instant invention to provide a root mean square voltage regulator circuit which does not require a heavy and expensive transformer which has been used in previous systems.

It is another object of this invention to provide a root mean square voltage regulator circuit which utilizes an incandescent bulb in its bridge circuit rather than an electron tube since the bulb filament responds much faster to changes in line voltage than do tube filaments. In this way the likelihood of low frequency oscillation is minimized when the circuit is used with a saturable reactor, and the likelihood of hunting is minimized when the circuit is used with a Variac.

It is a further object of this invention to provide a root mean square regulator circuit which allows the use of a lower wattage adjustment potentiometer because of the low currents involved.

It is still a further object of this invention to provide a root mean square voltage regulator circuit in which the low value of inductance in the bulb filament obviates the necessity of utilizing additional inductance for the purpose of reducing harmonics.

Other objects and many of the attendant advantages will be readily appreciated as the same becomes better understood by reference to the following detailed description when considered in connection with the accompanying drawing.

In the drawing, numeral 1 denotes an alternating voltage generator. The generator voltage is impressed across Variac 2 (for a saturable reactor) which is connected to ground. This Variac provides a voltage source for a load (not shown). The movable tap 3 of Variac 2 is mechanically connected by linkage 34 to the output of direct current motor 4 which changes the position of movable tap 3 in accordance with intelligence received from the root mean square regulator circuit shown generally at 5. Line 6, which is connected to movable tap 3 supplies the regulated voltage to a load (not shown).

Connected between line 6 and ground is a bridge network 7 which consists of resistors 8, 9, 10, and 11, and incandescent bulb 12. Resistor 9 is variable, as shown, to provide means for balancing the bridge circuit. As the line voltage changes from the value at which bridge 7 is balanced there will be a change in the root mean suare voltage across bulb 12 which will in turn cause a change in the temperature of the bulb, which in turn results in a change of the bulb filament resistance, and thereby causes an unbalance of the bridge circuit. The bridge will then produce a voltage output because of its unbalance. This output voltage is transmitted from the bridge circuit by lines 13 and 14 to the grid and cathode, respectively, of amplifier tube 15. Biasing resistor 16 biases the cathode of tube 15. The plate of amplifier tube 15 is connected to B+ via resistance 17. It can be seen that when bridge 7 is in the balanced condition that there will be no voltage drop across the cathode and grid of amplifier tube 15. However, when the bridge 7 becomes unbalanced an alternating voltage will be impressed across the grid and cathode of tube 15 which is caused by the difference in potential now existing between the junction of resistors 8 and 9, on one hand, and between the potential existing between bulb 12 and resistance 11. The bridge output voltage will then appear on the plate of tube 15 as an amplified and inverted replica of the bridge output. The phase of the output of tube 15 depends on which side of unbalance bridge 7 is operating.

The signal from the plate of tube 15 is applied to the grid of phase detector tube 18 via blocking capacitor 19. The plate of tube 18 is connected to B+ via resistance 21. A voltage which is in phase with the line voltage is taken from the junction of resistors 10 and 11 and applied to the cathode of tube 18 via line 20. This arrangement provides a means for phase detecting the output of amplifier tube 18. When bridge 7 is balanced, the plate voltage of the phase detector tube will be of a predetermined magnitude. When bridge 7 is unbalanced the plate voltage of tube 18 will be either greater or less than its output when bridge 7 is balanced depending on whether the bridge output is in phase or out of phase with the line voltage. The output of phase detector tube 18 is taken across capacitor 22 which is connected across resistor 10 and the plate of phase detector tube 18. Resistors 23, 24, 25, and 26 are connected in parallel with capacitor 22. Capacitor 22 and resistors 23, 24, 25, and 26 filter the output from phase detector tube to provide a direct voltage.

When a change occurs in the line voltage this direct voltage will increase with line voltage decrease, and it will decrease with line voltage increase according to the following mode of operation. When the line voltage increases, the resistance of bulb 12 will increase thereby unbalancing the bridge 7. The potential at the junction of bulb 12 and resistance 11 will be lower than the potential at the junction of resistors 8 and 9. Therefore the grid of tube 15 will become more positive than the cathode of tube 15. The voltage at the plate of tube 15 will decrease and this lower voltage will be impressed on the grid of phase detector tube 18. The voltage on the cathode of tube 18, under the aforementioned conditions, is out of phase with the output from amplifier tube 15 which appears on the grid of tube 18. The plate voltage of tube 18 will therefore decrease which will be reflected as a lower direct voltage on capacitor 22. On the other hand, when the line voltage decreases the direct voltage across capacitor 22 will increase in accordance with the mode of operation set forth above.

The direct voltage thus produced is fed to the grid of amplifier tube 27 which has its cathode connected to ground and its plate connected to the cathode of amplifier tube 28 via resistances 29 and 30. The plate of tube 28 is connected to B+ via resistance 31. Line 32 of direct current motor 4 is connected to the cathode of tube 28 in cathode follower relationship. Line 33 of motor 4 is connected to a constant positive voltage D+.

When bridge 7 is in balance the voltage at the cathode of tube 28 is equal to the voltage D+. Under these conditions motor 4 will not rotate. However, when bridge 7 becomes unbalanced, the voltage at the cathode of tube 28 will be more or less than D+, since the impedance of tube 28 is changed, thereby causing the motor 4 to rotate in one direction or the other depending on the direction of the unbalance. Mechanical linkage 34 connects motor 4 to the movable tap 3 of Variac 2 to provide the necessary regulation. The rotation of motor 4 moves tap 3 of Variac 2 to regulate the line voltage.

In order to set up the regulator of this invention tap 3 is manually adjusted to provide the desired line voltage and resistance 9 is adjusted to balance bridge 7 at this value of line voltage.

Obviously many modifications and variations of the present invention are possible in the light of the above teachings. It is therefore to be understood that within the scope of the appended claims the invention may be practiced otherwise than as specifically described.

Having thus described my invention I claim:

1. A voltage regulating system for regulating a source of alternating voltage comprising a thermally sensitive bridge having input and output terminals, said input terminals being connected across said source, said bridge being balanced when said source is of a predetermined magnitude and being unbalanced when said source varies from said predetermined magnitude, phase detection circuit means, means operatively connecting said bridge output terminals to said phase detection circuit means, means operatively connecting said source to said phase detection circuit means, said phase detection circuit means producing a direct output voltage which varies in magnitude with the phase and magnitude of the output of said bridge, amplifying means coupled to the output of the phase detection circuit means for producing a direct voltage which varies with the magnitude of the output of the phase detection circuit means, a direct current motor having two terminals, one terminal being coupled to said direct voltage producing means, the other terminal being coupled to an independent source of direct voltage, said direct voltage producing means and said independent source of direct voltage having a common point of reference potential, the direction of rotation of said direct current motor being dependent on the relative magnitudes of the direct voltages applied to its terminals, and means coupled to the direct current motor for regulating the source of alternating voltage.

2. A voltage regulating system for regulating a source of alternating voltage comprising a thermally sensitive bridge having input and output terminals, said input terminals being connected across said source, said bridge being balanced when said source is of a predetermined magnitude and being unbalanced when said source varies from said predetermined magnitude, phase detection circuit means, means operatively connecting said bridge output terminals to said phase detection circuit means, means operatively connecting said source to said phase detection circuit means, said phase detection circuit means producing a direct output voltage which varies in magnitude with the phase and magnitude of the output of said bridge, amplifying means coupled to the output of the phase detection circuit means for producing a direct voltage which varies with the output of the phase detection circuit means, and means coupled to said amplifying means for regulating the source of alternating voltage.

3. A system for regulating a source of alternating voltage comprising a thermally sensitive bridge having input and output terminals, said bridge having one leg consisting of an impedance which varies with the source voltage, said input terminals being connected across said source, said bridge being balanced when said source is of a predetermined magnitude and being unbalanced when said source varies from said predetermined magnitude, an amplifier tube having a cathode, grid, and plate, the output terminals of said bridge being connected to said amplifier tube cathode and grid, a phase detector tube having a cathode, grid, and plate, means coupling said amplifier tube plate and said voltage source to the cathode and grid of the phase detector tube whereby the phase detector tube produces an output on its plate which varies with the phase and magnitude of the bridge unbalance, means coupled to the output of the phase detector tube for producing a direct voltage which varies with the magnitude of the output of the phase detection tube, and means coupled to the direct voltage producing means for regulating the source of alternating voltage.

4. A circuit for producing a direct voltage output which varies inversely with the change of an alternating voltage input comprising a thermally sensitive bridge having input and output terminals, said bridge having one leg consisting of an impedance which varies with the alternating voltage input, said input terminals being connected across said alternating voltage input, said bridge being balanced when said alternating voltage input is of a predetermined magnitude and being unbalanced when said alternating voltage varies from said predetermined magnitude, an amplifier tube having a cathode, grid, and plate, the output terminals of said bridge being connected to said amplifier tube cathode and grid, a phase detector tube having a cathode, grid, and plate, the plate of said amplifier tube and said voltage source being coupled to said phase detector tube cathode and grid whereby the phase detector tube produces an output which varies with the phase and magnitude of the bridge output, and means coupled to the output of said phase detection means for producing a direct voltage which varies directly with the output of the phase detection means and inversely with the magnitude of the change of the alternating voltage input.

5. A system for regulating a source of alternating voltage comprising: a thermally sensitive bridge having input and output terminals, said bridge having one leg consisting of an impedance which varies with the source voltage, said input terminals being connected across said source, said bridge being balanced when said source is of a predetermined magnitude and being unbalanced when said source varies from said predetermined magnitude, an amplifier having a control element, means connecting the output terminals of said bridge to said amplifier control element, a phase detector tube having a cathode, grid, and plate, means coupling the output of said amplifier to the grid of said phase detector tube, means coupling said source voltage to the cathode of said phase detector tube, whereby said phase detector tube produces an output on its plate which varies with the phase and magnitude of the bridge output, means coupled to the output of said phase detector tube for producing a direct voltage which varies with the magnitude of the output of the phase detector tube, an independent source of direct voltage, said direct voltage producing means and said independent source of direct voltage having a common point of reference potential, a direct current motor having two terminals, one terminal being coupled to said direct voltage producing means the other terminal being coupled to said independent source of direct voltage, the direction of rotation of said direct current motor being dependent on the relative magnitudes of the direct voltages applied to its terminals, and variable transformer means coupled to said direct current motor for regulating the source of alternating voltage.

References Cited in the file of this patent

UNITED STATES PATENTS

| | | |
|---|---|---|
| 2,239,768 | Artzt | Apr. 29, 1941 |
| 2,453,451 | Mosely | Nov. 9, 1948 |
| 2,510,467 | Fuge | June 6, 1950 |
| 2,584,748 | Smith | Feb. 5, 1952 |
| 2,682,635 | Henrich | June 29, 1954 |
| 2,690,535 | Douma et al. | Sept. 28, 1954 |